United States Patent [19]

Nobles et al.

[11] Patent Number: 4,460,395
[45] Date of Patent: Jul. 17, 1984

[54] METHOD AND APPARATUS FOR PRODUCING FOOD GRADE CARBON DIOXIDE

[75] Inventors: John E. Nobles, Prairie Village, Kans.; Leonard K. Swenson, Kansas City, Mo.

[73] Assignee: The Pritchard Corporation, Kansas City, Mo.

[21] Appl. No.: 458,845

[22] Filed: Jan. 18, 1983

[51] Int. Cl.$^3$ ............................................... F25J 3/02
[52] U.S. Cl. ........................................ 62/18; 423/437; 62/24; 62/31
[58] Field of Search ................. 423/437; 62/9, 10, 11, 62/12, 19, 20, 23, 24, 31, 18

[56] References Cited

U.S. PATENT DOCUMENTS 2,548,498  4/1951  Russell et al. ...................... 423/437
3,643,451  2/1972  Foucar ................................. 62/28

Primary Examiner—Frank Sever
Attorney, Agent, or Firm—Schmidt, Johnson, Hovey & Williams

[57] ABSTRACT

A method is disclosed of producing food grade carbon dioxide from an impure carbon dioxide source stream containing contaminants which may include light and heavy hydrocarbons (at least $C_1$ to $C_3$) and light sulfur compounds such as hydrogen sulfide and carbonyl sulfide as well as heavier sulfur constituents in the nature of mercaptans (RSH) and/or organic mono and disulfides (RSR and RSSR). Nitrogen, water and/or oxygen may also be present in varying amounts in the impure feed stream. The feed gas is first rectified with liquid carbon dioxide condensed from a part of the feed stream to remove heavy hydrocarbons and heavy sulfur compounds, then passed through an absorber to effect removal of the light sulfur compounds, next subjected to an oxidizing atmosphere capable of converting all of the $C_2$ hydrocarbons and optionally a part of the methane to carbon oxides and water, chilled to condense the water in the remaining gas stream without formation of hydrates, liquefied for ease of handling and storage and finally stripped to remove residual contaminants such as methane, carbon monoxide and nitrogen to produce the final food grade carbon dioxide product.

5 Claims, 2 Drawing Figures

METHOD AND APPARATUS FOR PRODUCING FOOD GRADE CARBON DIOXIDE

FIELD OF THE INVENTION

This invention relates to a process for producing food grade carbon dioxide from impure carbon dioxide containing gas streams contaminated with sulfur compounds and hydrocarbons of a composition and present at levels which have heretofore precluded their being used as a source for food grade $CO_2$.

BACKGROUND OF THE INVENTION

Carbon dioxide meeting food grade specifications has for the most part been a by-product of ammonia and hydrogen plants. Recently, however, many of the existing plants for producing ammonia and/or hydrogen streams have been taken off stream because of the steadily increasing cost of natural gas and which shows no present sign of abating. Furthermore, the demand for fertilizer products has declined as farmers have been required to find ways of more efficiently utilizing the nutrients which they return to the soil. Closing of the traditional sources of food grade carbon dioxide coupled with increased demand therefor in the beverage trade has created a shortage of food grade carbon dioxide resulting in inflated prices in the marketplace, especially on a spot market basis. The problem of food grade $CO_2$ shortages has been compounded by the current popularity of so-called light beers which contain less alcohol than conventional beers. The fermentation process is interrupted at an earlier time period in the production of light beer than conventional beers thus resulting in significantly less carbon dioxide in the beverage. For this reason, in order to assure presence of an adequate amount of $CO_2$ in the beer from a taste standpoint, additional carbon dioxide must be added to the beer prior to packaging.

Natural gas streams often contain quantities of carbon dioxide in varying amounts which in some instances are substantial proportions of the well head product. However, it is expensive to remove contaminants in natural gas carbon dioxide sources to an extent that food grade specifications can be met.

One additional complication has been the utilization of gas streams containing relatively high proportions of carbon dioxide for so-called "enhanced oil recovery" or EOR processes for recovery of oil in the ground which is present in the form of highly viscous deposits. When carbon dioxide is injected into the viscous oil, the viscosity of the oil is thereby reduced thus allowing the oil to flow out of the well. The carbon dioxide goes into solution in the oil reducing its effective viscosity as much as 1000 times the initial value thereof. Because the procedure only works where the pressure is of the order of 1200 psi or more and thereby close to the critical pressure of the gas, the major use of EOR processes is in fields deep enough that the pressure on the carbon dioxide can be brought to levels on the order of 1800 to 2400 psia. The process works even if the carbon dioxide contains impurities such as hydrocarbons and sulfur compounds. These contaminants do not affect the ability of the carbon dioxide injected into the ground to lower the viscosity of oil deposits at relatively great depths.

However, one operating limit on the practice of recovering otherwise irretrievable viscous oil deposits utilizing carbon dioxide under pressure injected into the ground is the fact that if the hydrogen sulfide level in the gas is present in proportions exceeding about 100 parts per million, a potentially dangerous condition exists by virtue of the fact that the contaminated carbon dioxide injected into the ground can follow fissures or underground passages along paths ultimately resulting in the gas being released to the atmosphere at ground level. Gas returning to the atmosphere containing lethal levels of hydrogen sulfide can be deadly particularly in view of the fact that the well processor has no way of ascertaining beforehand exactly where the gas might surface. As a result, at least in the State of Texas, regulations now provide that well processors using EOR practices wherein carbon dioxide is injected into the ground under high pressure, must use a gas source containing no more than about 100 parts per million of hydrogen sulfide in the carbon dioxide stream forced into the ground under high pressure.

The wide-spread adoption and increasing popularity of EOR processing procedures has not only placed additional pressure on the food grade carbon dioxide market since gas contaminated at levels beyond that acceptable for food applications may be used for EOR processes, but in addition, the availability of a market for somewhat contaminated gas which is a by-product of food grade $CO_2$ production processes has for the first time increased the viability from an economic standpoint of producing food grade carbon dioxide from natural gas source streams.

DESCRIPTION OF THE PRIOR ART

The prior patent art includes Jones, U.S. Pat. No. 1,873,418 of Aug. 23, 1932; Metzker, U.S. Pat. No. 1,942,485 of Jan. 9, 1934; Gilmore, U.S. Pat. No. 2,016,815 of Oct. 8, 1935; Reich, U.S. Pat. No. 2,122,586 of July 5, 1938; Schmidt, U.S. Pat. No. 2,143,283 of Jan. 10, 1939; Russell, et al., U.S. Pat. No. 2,548,498 of Apr. 10, 1951; Silverberg, U.S. Pat. No. 2,551,399 of May 1, 1951; Geisel, U.S. Pat. No. 2,594,268 of Apr. 22, 1952; Ruhemann, et al., U.S. Pat. No. 3,317,278 of May 2, 1967; Weir, et al., U.S. Pat. No. 3,493,339 of Feb. 3, 1970; Foucar, U.S. Pat. No. 3,643,451 of Feb. 22, 1972; and Staege, U.S. Pat. No. 4,169,133 of Sept. 25, 1979.

In the Ruhemann, et al. U.S. Pat. No. 3,317,278 the carbon dioxide purification process as described contemplates subjecting the impure carbon dioxide to a first distillation or rectification step at super atmospheric pressure and a temperature below ambient temperature to effect removal of the more volatile components from the carbon dioxide before further treatment of the latter. The gas stream is then subjected to an oxidation step using air or oxygen or a catalyst bed which is said to effect conversion of the heavier hydrocarbons such as propane, butane and pentane by oxidation of such compounds. The stream is next subjected to a catalytic oxidation at a super atmospheric pressure and an elevated temperature to oxidize any remaining hydrocarbon impurities. Ruhemann, et al. state:

> Hydrocarbons which are present in small quantities in inert gases may be removed by oxidation and air or oxygen over certain catalysts. It has been found that these catalytic oxidation reactions proceed more easily with the heavier hydrocarbons, such as propane, butane and pentane, than with the lighter hydrocarbons, ethane and methane. In particular, it has been found that the temperatures required for the catalytic oxidation of ethane and methane are higher than those required for the oxidation of propane and higher hydrocarbons. Thus, if carbon dioxide containing all the above hydrocarbons as impurities is conducted over a catalyst in the presence of air, there will be a tendency for the heavier hydrocarbons to be completely removed while the lighter hydrocarbons will be only partially oxidized. In order to insure the complete removal of all of the hydrocarbons, it is necessary to conduct the reaction at an inconveniently high temperature. Moreover, the oxidation reactions themselves, which result in the formation of carbon dioxide and water vapor, proceed exothermally so that, if they are initiated at a sufficiently high temperature to insure complete oxidation, they may lead, as a result of the reactions themselves, to temperatures so high as to be dangerous to the catalyst.

It is therefore apparent that Ruhemann, et al. felt that in order to obtain a relatively pure carbon dioxide final product, it was necessary to oxidize the higher hydrocarbons followed by a second oxidative treatment step to completely oxidize the remaining hydrocarbon content of the feed stream.

Reich in U.S. Pat. No. 2,122,586 describes a process for the purification of carbon dioxide wherein the gas stream is cooled to separate organic impurities therefrom and is then introduced into an oxidizing scrubber which is cooled sufficiently and contains a material such as a hexavalent chromium compound for oxidizing the organic impurities remaining in the gas stream. Next, the gas is passed through a sulfuric acid scrubber and then through a coke-soda ash scrubber followed by a lime-oil scrubber.

Geisell in U.S. Pat. No. 2,594,268 suggests purification of gaseous carbon dioxide by passing the contaminated gas stream together with oxygen over an activated carbon bed at elevated pressures and temperatures. The activated carbon is described as having been especially prepared by treating mineral coal in a shaft furnace with hot combustion gases which are blown through the coal with sufficient pressure to establish a strong agitation of the coal and until the amount of carbon oxysulfide therein is substantially reduced.

The Silverberg U.S. Pat. No. 2,551,399 describes a process for the purification of carbon dioxide wherein fractionation of the contaminated stream is carried out in successive stages to effect removal of a substantial proportion of the impurities. The process involves utilization of a separator, a fractionator and a stripper in specific sequence.

SUMMARY OF THE INVENTION

The present process provides an economically feasible method of treating an impure carbon dioxide gas stream derived from natural gas or the like which contains contaminants including light and heavy hydrocarbons (at least $C_1$ to $C_3$) and light sulfur compounds such as hydrogen sulfide and carbonyl sulfide as well as heavier sulfur constituents in the nature of mercaptans (RSH) and/or organic mono and disulfides (RSR and RSSR). Water is generally present in varying amounts in the impure feed stream and is produced during practice of the process. Nitrogen and oxygen are introduced into the stream during processing, depending on the source of $O_2$ used and this must be removed before transmission of the final food grade product to storage or use.

The impure feed stream is first subjected to a fractionation step wherein a part of the feed gas is condensed and the resulting liquid caused to flow in countercurrent relationship to incoming impure gas to be purified. Heavy hydrocarbons and heavy sulfur compounds are dissolved in the liquid carbon dioxide reflux stream so that the overhead from the fractionation step is substantially free of heavy sulfur materials and $C_3+$ hydrocarbons. The feed stream is then heated and directed into an absorption zone preferably containing zinc oxide as an absorption medium whereby the light sulfur compounds are removed from the product stream. The gas to be purified is heated to an even higher level and introduced into an oxidizing atmosphere comprising a catalyst bed which also receives an oxidizing medium such as air or $O_2$ with the conditions of treatment and the residence time of the gas in the oxidizing zone being such that $C_2+$ hydrocarbons remaining in the gas stream are oxidized and only part of the methane present in the gas is converted to carbon oxides and water. Next the gas is chilled to an extent that water present in the gas is condensed without forming appreciable amounts of carbon oxide-water hydrates whereupon the gas is then liquefied for ease of storage and handling, and finally subjected to a stripping operation capable of removing residual contaminants such as methane and carbon dioxide from the final food grade carbon dioxide product.

TYPICAL CARBON DIOXIDE SOURCE GAS STREAMS

Natural gas used for heating sources typically contains 70 to 100% methane, 0 to 30% carbon dioxide, 0 to 30% hydrogen sulfide, 0 to 10% nitrogen, and varying amounts of other contaminants including light and heavy sulfur compounds as well as heavier hydrocarbons. In those instances where the carbon dioxide level exceeds 30% by any appreciable amount, the gas is not useful as a heat source without substantial treatment to remove carbon dioxide and hydrogen sulfide.

Although gas streams containing relatively high quantities of carbon dioxide may have usefulness in EOR oil recovery processes, as previously indicated, the stream must be treated to remove hydrogen sulfide therefrom in most instances to meet state regulatory specifications and also assure maximum utility of the gas for decreasing the viscosity of the underground oil deposits.

In order to qualify as food grade carbon dioxide one specification therefor is established by the requisites of the U.S. Pharmacopeia, Volume 19 at pages 70 and 71. Generally, for commercial purposes, the carbon dioxide final product on a volume basis should have no more than about 35 parts per million of methane and preferably no more than about 5 to 10 parts per million of $CH_4$, less than 10 parts per million of carbon monoxide, no greater than 5 parts per million of sulfur dioxide, preferably no more than about 0.1 part per million of hydrogen sulfide, a maximum of 0.5 part per million of carbonyl sulfide with a total sulfur content of no more than about 1 part per million and preferably no more than about 0.5 part per million total sulfur. Although feed streams useful for producing food grade carbon dioxide therefrom may vary as indicated, a typical feed gas on a mole percent basis may for example include: 98+% $CO_2$, 1+% $CH_4$, 500 parts per million of ethane, 90 parts per million of propane, 60 parts per million of hydrogen sulfide, 10 parts per million of carbonyl sulfide, 20 parts per million of organic mercaptans and 45 parts per million of organic mono and disulfides present in amounts equalling a total of 100%.

DESCRIPTION OF THE PREFERRED EMBODIMENT

Figure 1:
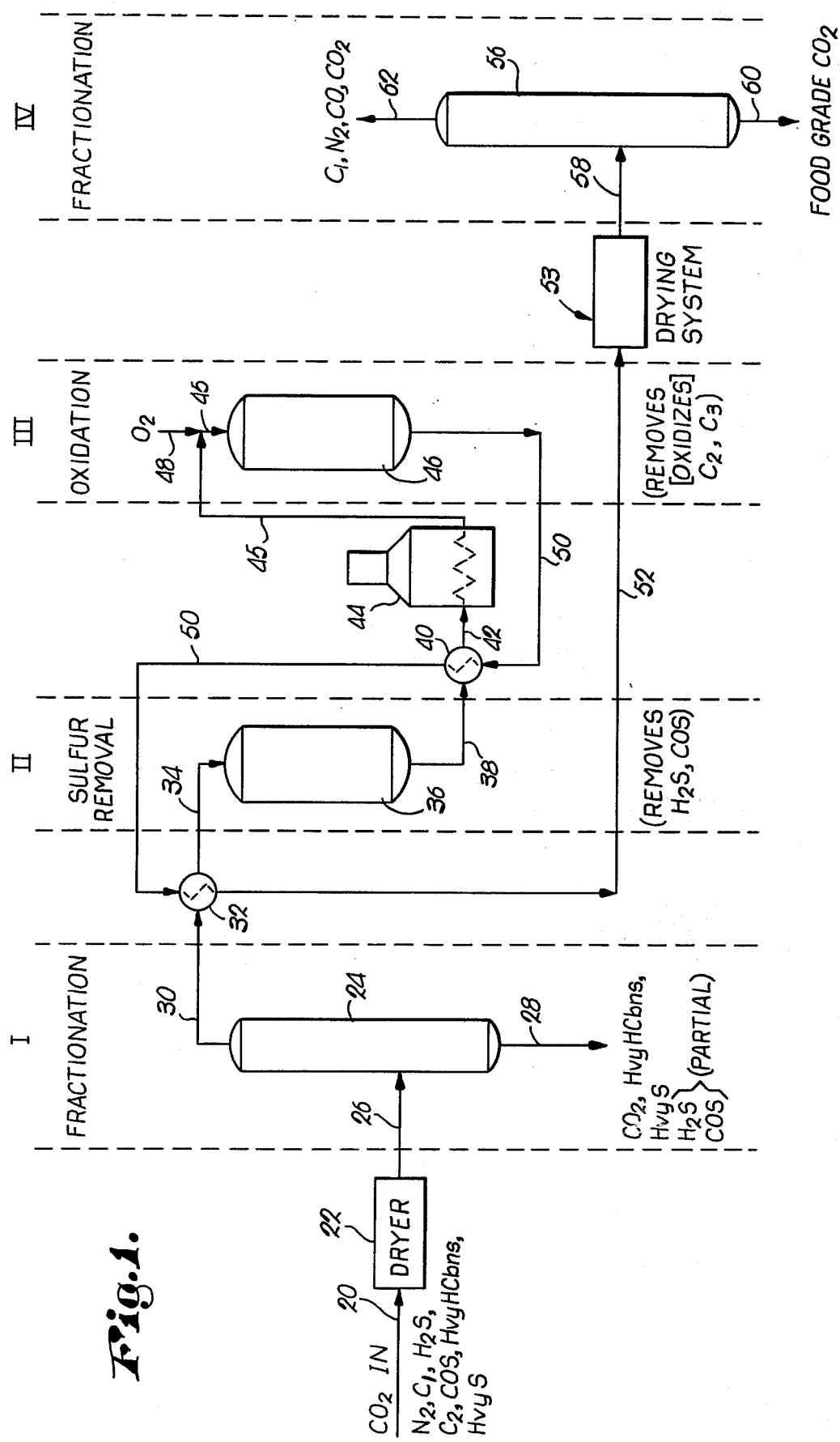
FIG. 1 is a schematic representation of the principal operating steps of the present process wherein the impure carbon dioxide gas stream is subjected in successive order to a first fractionation, then sulfur removal, next oxidation and finally a second fractionation to produce a final food grade product.

As depicted in FIG. 1, the impure carbon dioxide gas stream which typically contains diluents or contaminants including nitrogen, light and heavy hydrocarbons, and light and heavy sulfur compounds is directed via infeed line 20 to a dryer 22 for removing water vapor from the gas. In the first Stage I, the gas is subjected to a fractionation or rectification process capable of removing substantially all of the heavy hydrocarbons and heavy sulfur compounds. In Stage I, the incoming gas stream is directed into rectifier column 24 via inlet line 26 where the gas stream is subjected to reflux liquid in the nature of liquid carbon dioxide. The liquid carbon dioxide underflow from rectifier column 24 and which contains heavy hydrocarbons and sulfur compounds dissolved therein is directed to a storage facility via line 28. The underflow from rectifier column 24 is of such nature that it can be used for EOR processes depending upon the level of hydrogen sulfide therein and even in the instance where the $H_2S$ level is above that specified by a particular state regulation or the like, further treatment of the gas stream may be economically viable to lower the hydrogen sulfide content to an acceptable level for EOR use.

The gas overhead from rectifier column 24 is directed via line 30 through heat exchanger 32 and thence line 34 into absorption vessel 36 of absorption Stage II. The absorber 36 contains an absorption medium such as zinc oxide capable of removing substantially all of the light sulfur compounds such as hydrogen sulfide and carbonyl sulfide from the gas stream. The gas outflow from absorber vessel 36 is directed via line 38 into heat exchanger 40 and then via line 42 into a gas fired heater 44. The gas stream exiting from heater 44 is conveyed via line 45 to the catalytic oxidizing vessel unit 46 of oxidation Stage III which also receives a source of an oxidizing medium such as air or $O_2$ which communicates with line 45 of unit 46 through the means of an air or oxygen supply line 48. All of the ethane in the gas stream plus a part of the methane (usually no more than about one-third of the total proportion thereof) is oxidized to carbon monoxide and carbon dioxide.

The exit gas from oxidizing unit 46 flows via line 50 into heat exchanger 40 for sensible heat exchange with the gas flowing to heater 48 through lines 38 and 42 respectively and then interchanges with the gas stream flowing from rectifier vessel 24 to absorber 36 by virtue of line 50 leading from heat exchanger 40 to heat exchanger 32. The gas output from heat exchanger 32 flows via line 52 through a drying system 53 and is then further fractionated in Stage IV in means generically numerated 56 coupled to drying system 53 by line 58. In the drying system 53, the gas is chilled to condense water without formation of carbon oxide-hydrates and passed across a molecular sieve bed to absorb residual water and is then liquefied by fractionation unit 56 before being directed to the food grade carbon dioxide storage facilities via line 60. Methane, carbon monoxide, purge carbon dioxide and nitrogen if present in the feed gas are vented to the atmosphere or to a suitable point of use thereof via line 62.

Figure 2:
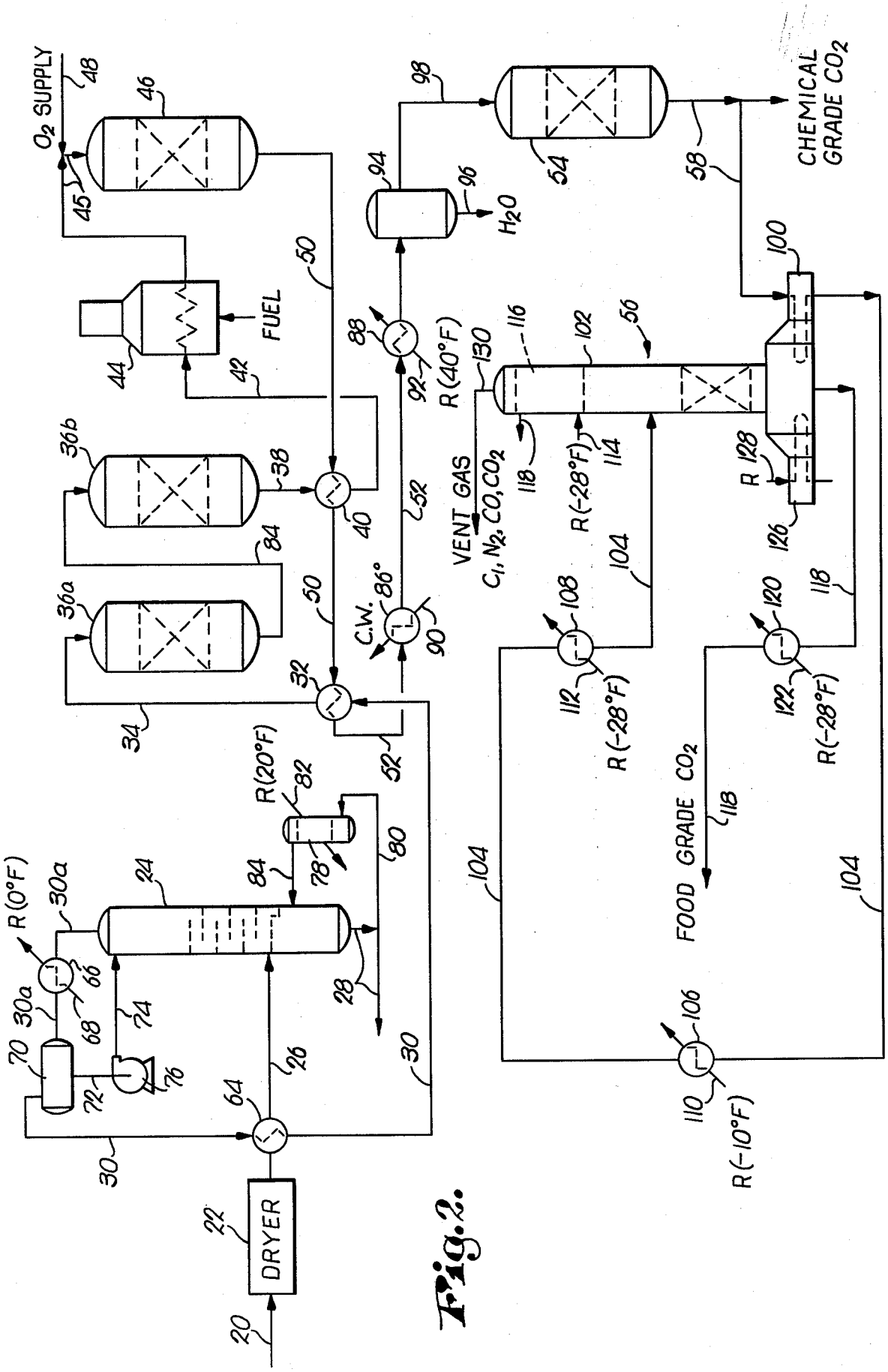
FIG. 2 is a process flow diagram for carrying out the steps illustrated schematically in FIG. 1 in accordance with a preferred embodiment of the invention.

In FIG. 2, suitable equipment and the preferred interrelationship therebetween is depicted in somewhat greater detail than FIG. 1 for a better understanding of how the process may be most beneficially carried out in accordance with the concepts of this invention. For convenience, similar numbers are used in the schematic of FIG. 2 as are employed in FIG. 1 for the same lines or pieces of equipment. Although a specific embodiment of the process is described in connection with the following detailed embodiment of the process, it is to be understood that the parameters set forth are for exemplary purposes only and not to be construed as the only operation conditions for the process.

Referring to FIG. 2, the infeed line 20 for the impure carbon dioxide gas stream is again shown as leading to molecular sieve dryer 22 which in turn is coupled to the rectifier column 24 by line 26. Gas flowing from dryer 22 to the rectifier column 24 first passes through a carbon dioxide feed prechiller 64 which brings the gas into heat interchange relationship with the gas overhead from fractionation or rectifier column 24. Gas overhead line segment 30a of line 30 communicates the top of vessel 24 with refrigerant heat exchanger 66 which for example may receive a refrigerant such as ammonia introduced into heat exchanger 66 via line 68 at an exemplary temperature of the order of 0° F. The product passing from heat exchanger 66 flows into separator 70 which is operable to allow product in vapor form to flow upwardly therefrom via line 30 into heat exchanger 64 while condensed liquid flows out of separator 70 through line 72, into pump 76 and then back into the top of rectifier column 24 through the medium of line 74. Condensed carbon dioxide separated from the gas stream in separator 70 is thereby returned to column 24 for flow downwardly in the column in countercurrent relationship to the gas stream flowing upwardly therein to effect thorough washing of the gas with the liquid. The surface area contact of gas by liquid is enhanced by the trays or other equivalent packing contained in the vessel 24. Heavy hydrocarbons ($C_3+$) and heavier sulfur compounds in the nature of mercaptans (RSH) and/or organic mono and disulfides (RSR and RSSR) dissolve in and are absorbed by the reflux liquid carbon dioxide flowing downwardly in the column 24 and exit therefrom via line 28. Depending on the proportion of the gas infeed which is liquefied in the refrigeration section at the top of column 24 and returned to the latter as reflux liquid, a portion of the underflow from vessel 24 may be is split off from the liquid flow through line 28 and returned to the carbon dioxide reboiler 78 through line 80. In this instance, refrigerant from a suitable source thereof is brought into heat exchange with the liquid introduced into reboiler 78 via line 80 through a suitable supply line 82 and which in a typical operation may for example comprise ammonia at +20° F. Line 84 returns gaseous carbon dioxide and any residual impurities therein to vessel 24. The provision of the liquefaction apparatus associated with the gaseous outflow from vessel 24 and controllable reboiler 78 permits close monitoring and control of the proportion of carbon dioxide which is condensed and recycled into the rectifier column 24 for scrubbing gas infeed to remove heavy hydrocarbons and the heavier sulfur compounds that may be contained therein.

Line 30 connects to heat exchanger 32 downstream of prechiller 64 with the outfeed being directed into absorber vessel 36a through line 34. Although the preferred absorption medium in vessel 36a is zinc oxide since it is very selective for lighter sulfur compounds such as hydrogen sulfide and carbonyl sulfide, other absorption methods may be employed so long as the sizing thereof and the operational characteristics are such that the process is capable of removing virtually all of the lighter sulfur compounds from the gas stream as it flows through the absorption Stage II. In practice, it is preferred to use two serially connected zinc oxide beds, one of which has been designated by the numeral 36a while the second absorber 36b receives gas from the first absorber through the provision of line 84 therebetween. The purpose of the second absorption bed 36b is to guard against any residual light sulfur compounds in the gas stream passing through the absorption zone into the Stage III oxidizer.

Zinc oxide is the preferred absorption medium; however, other equivalent absorption agents may be employed such as $Fe(OH)_2$ sponge, chemical or physical solvents such as propylene glycol or methyldiethanolamine, or metal vanadate and anthraquinone disulfonic acids used as an absorption medium in accordance with the Stretford process.

Removal of the light sulfur compounds with hot zinc oxide is the process of choice because of the effectiveness of the absorbant and its applicability to a wide variety of impure gas feed stocks. When the impure gas is preheated to a range of 550° to 750° F. and passed through dual zinc oxide beds in the form of small pellets, spheres or extrusions, the zinc oxide is capable of absorbing up to 18 to 20 weight percent sulfur before losing effectiveness. Zinc oxide also has the capability of removing carbonyl sulfide from the gas stream which is not true with more conventional sulfur removal agents such as activated carbon. Although the zinc oxide cannot be regenerated and must be discarded after use, its efficiency as a sulfur removal agent dictates preferred use thereof. Furthermore, by employing two beds as indicated, the life of the second bed is considerably longer than the first stage since it functions primarily as a guard bed to preclude even small amounts of light sulfur compounds from being directed into the oxidizing zone where the sulfur could poison the catalyst used for enhancement of oxidation.

The outfeed line 38 from the second zinc oxide bed 36b passes into heat exchanger 40 while line 42 therefrom leads directly to the heater 44. The gas stream heated to the required temperature for oxidation of ethane and any remaining $C_3+$ hydrocarbons in the gas is conveyed via line 45 into the oxidation reactor 46. $O_2$ supply line 48 is coupled to line 45 through a tee or the equivalent for selective direction of air or oxygen to the vessel 46.

The outlet line 50 from oxidation reactor 46 leads to heat exchanger 40 and thence to heat exchanger 32 for bringing the gas stream into heat exchange relationship with the outfeed from zinc oxide bed 36b and the inlet to zinc oxide bed 36a respectively. The gas flowing through line 52 from heat exchanger 32 first is brought into heat exchange relationship with cooling water flowing through heat exchanger 86 and then refrigerant supplied to heat exchanger 88. In a typical process as herein described water is supplied to exchanger 86 through line 90 while ammonia refrigerant at a temperature of for example 40° F. may be supplied to exchanger 88 via line 92. Water which is condensed from the gas stream as a result of passing through exchangers 86 and 88 is removed by the separator 94 which has a liquid outlet line 96 extending from the lower end thereof. Gas flowing from separator 94 is conveyed to the molecular sieve dryer 54 through line 98 extending between separator 94 and vessel 54. Although only one vessel 54 has been illustrated for simplicity, it is to be understood that in actual practice at least two vessels will be provided each containing molecular sieve material so that during absorption of water by one molecular sieve bed, the other may be subjected to hot $CO_2$ gases to effect regeneration thereof. If desired, a layer of activated charcoal may be provided in vessel 54 to enhance its capacity to remove condensible contaminants that may remain in the gas stream as supplied to the vessel. It is also to be appreciated at this point that drying system 53 referred to generically in FIG. 1, comprises exchangers 86 and 88 as well as separator 94 and vessel 54.

Line 58 extending from the bottom of the molecular sieve vessel 54 preferably leads to the carbon dioxide stripper reboiler section 100 of carbon dioxide stripper column 102. Fractionation unit 56 may also include a refrigerant subcooler 126 at the bottom of column 102 opposite reboiler section 100 for passage of ammonia refrigerant therethrough via line 128.

Line 104 leading from reboiler section 100 communicates with a first stage refrigeration exchanger 106 as well as a second stage refrigeration 108 before returning to the intermediate section of carbon dioxide stripper column 102. Exchanger 106 receives refrigerant ammonia for example at a level of $-10°$ F. supplied via line 110 while refrigerant line 112 furnishes ammonia refrigerant to exchanger 108 at a temperature for example of about $-28°$ F. The refrigerant exchangers 106 and 108 serve to liquefy the carbon dioxide before introduction thereof into the carbon dioxide stripper column 102. Another refrigerant supply line 114 leads into the lower part of the upper section of column 102 which forms a carbon dioxide stripper condenser unit 116. Refrigerant flows out of the unit 116 via line 118. In an exemplary process, the ammonia refrigerant may for example be directed into unit 116 through line 114 at a temperature of $-28°$ F. Liquefied food grade carbon dioxide is delivered to a source of use, storage or transportation via line 118 which passes through refrigerant exchanger 120 located downstream of the bottom exit from stripper column 102. Ammonia refrigerant is supplied to exchanger 120 through line 122 and may in an exemplary process be for example of the order of $-28°$ F. Vent or purge gases exit from vessel 102 through line 130.

If it is desired to remove chemical grade carbon dioxide from the process prior to stripping thereof in the fractionation operation generically designated by the numeral 56, this may be accomplished through bypass line 124 connected to line 58 between molecular sieve 54 and reboiler section 100 of column 102.

OPERATION

Although the operation of the process herein described is in terms of a typical impure carbon dioxide gas stream containing for example 98+% carbon dioxide and methane as the major impurity, an even smaller amount of ethane, a very minor proportion of propane, some water vapor, and small amounts of hydrogen sulfide, carbonyl sulfide, and mercaptans (RSH) as well as mono and disulfides (RSR and RSSR), it is to be understood that the process is operable for purifying carbon dioxide streams having levels of impurities substantially in excess of those indicated for this specific example. Furthermore, for purposes of illustration only, it is assumed that the impure gas stream supplied to the process is at a temperature of about 60° F. and 370 psia.

Assuming this input stream, the refrigeration exchanger 66 may be operated such that when the temperature conditions of the system are properly correlated with the operating parameters for the reboiler 78, a requisite proportion of the gas overhead from rectifier column 24 is condensed and returned to the top of the column 24 for counterflow contact with the gas flowing upwardly in the vessel. The liquid carbon dioxide condensed and returned to column 24 on a molar basis should be from about 10% to about 300% of the gas directed to the process via line 30. In a typical operation as described assuming that the ammonia refrigerant introduced into exchanger 66 through line 68 is of the order of −0° Fahrenheit and the refrigerant to reboiler 78 is about +20° F., impure gas of the makeup generally described may be economically purified to food grade quality by directing gas to the process at a rate such that on a molar basis the condensed liquid carbon dioxide return to the column 24 is approximately one-third of the gas stream directed to the fractionation zone I.

Under these conditions, and assuming that the gas overhead from separator 70 is of the order of +9° Fahrenheit, heat exchanger 64 will lower the temperature of the gas to about 35° F. before entering the column 24. Similarly then, the liquid carbon dioxide return to column 24 through line 74 will be at a temperature of about 9° F.

In the process described under the conditions set forth, a typical liquid underflow from column 24 removed therefrom via line 28 will be at a temperature of about 11° F. and consist of carbon dioxide, a small part of the methane contained in the impure gas stream, a somewhat larger proportion of the ethane in the feed stock, substantially all of the propane as well as virtually all of the higher hydrocarbons originally contained in the feed stock, and all of the mercaptans and mono and disulfides or other heavy sulfur compounds. This underflow product is useful for EOR processes as previously described since it is either sufficiently low in hydrogen sulfide to permit direct use thereof or can be selectively treated using conventional absorption processes to lower the $H_2S$ level in the product.

The proportion of the liquid underflow from column 24 returned to reboiler 78 may be at a temperature of about 11° F. which is brought into contact with the +20° F. refrigerant introduced into reboiler 78 via line 82 thereby vaporizing the liquid prior to return thereof to column 24 via line 84.

The heat exchanger 32 is preferably operated under conditions such that the temperature of the gas stream leaving heat exchanger 64 and which for example may be the order of +47° F. is raised to a temperature in the range of 600° to 800° F. In the exemplary process described, a preferred temperature for the gas flowing through line 34 into the first zinc oxide bed 36a is of the order of 730° F. The zinc oxide absorbant beds 36a and 36b are sized to assure removal of the hydrogen sulfide and carbonyl sulfide contained in the feed stock before introduction thereof into the oxidation reactor 46. Most of the light sulfur compounds are absorbed by the bed 36a but any residual levels of sulfur constituents in the gas stream are absorbed by the guard bed 36b. The gas stream leaving guard bed 36b may for example be at a level of about 725° F. if such gas is at a temperature of 730° F. entering guard bed 36a. As a consequence, the heat exchanger 40 serves to further increase the temperature of the gas before it is directed into the oxidizer 46.

In order to ensure conversion of all $C_2+$ hydrocarbons remaining in the carbon dioxide feed gas to CO and $CO_2$, oxidation reactor 46 is provided with a catalyst capable of enhancing such oxidation and preferably comprising a noble metal catalyst in the platinum field such as ruthenium, rhodium, palladium, osmium, iridium and platinum agents. The preferred metal catalyst in this respect is a platinum composition. In instances where noble metal catalysts are employed to enhance oxidation of the hydrocarbons in the gas stream, the feed gas is preferably elevated in temperature by passage through heat exchanger 40 and combustion heater 44 to a level in the range of 600° F. to 900° F. A preferred temperature in this respect in accordance with the specific process described, is about 750° F. The oxygen supply in this respect furnished via line 48 may conveniently be in the form of air. The principal drawback to the use of air is the relatively low $O_2$ content and the need to subsequently remove nitrogen from the final product. Also, the sizing of reactor 46 and the operating temperature thereof should be correlated such that all $C_2$ and higher hydrocarbons remaining in the gas stream are converted to carbon monoxide and carbon dioxide and furthermore that all methane be oxidized if present in only a minor amount, or to effect oxidation of only a proportion of the methane if it constitutes as much as 1% of the total gas stream on a molar basis. Since most available feed stocks used to produce food grade carbon dioxide do in fact contain substantially more than 1% of methane on a molar basis relative to the total makeup of the feed gas, it is preferred that oxidation reactor 46 be operated under conditions such that about one-third of the methane in the feed stock is converted to carbon dioxide and carbon monoxide while all of the $C_2+$ hydrocarbons are oxidized in the presence of the catalyst. In the case where $C_2+$ hydrocarbons are converted and only a part of the methane oxidized as indicated, the outlet temperature from reactor 46 may for example be in the range of 800° F. to 900° F. and in the specific example set forth about 850° F. If the reactor though is to be operated under conditions to effect oxidation of relatively low levels of methane in the feed stock, then the outlet temperature of the oxidation reactor 46 will be somewhat higher and usually in the range of 800° F. to about 1600° F. If desired, oxidation reactor 46 may be split into two separate beds operated in serial order with cooling means therebetween. Gas may also be introducible into these beds at selectively alterable points along the length thereof to allow effective control over the temperature of the oxidation. Alternatively, a recycle blower may be required in certain instances to allow cooler gas to be inserted into the reactor as required to maintain the temperature of the oxidation reaction at an optimum level.

From reactor 46 the gas passes through heat exchanger 40 where the temperature is lowered to about 820° F. assuming an exit temperature of 850° F. from reactor 46 and then lowered to a level of about 140° F.

by passage through heat exchanger 32. Direction of suitable quantities of cooling water at a nominal temperature of 60° F. through exchanger 86 normally will result in cooling of the gas stream to a level of about 70° F. so that practical and efficient use may be made of the refrigeration exchanger 88 receiving ammonia refrigerant at +40° F. supplied via line 92, to further lower the temperature of the gas stream to about 45° F. before passing into the separator vessel 94. Water contained in the gas stream is condensed prior to introduction of the cooled gas stream into separator 94 whereby the water condensed in the gas stream is separated from the latter in vessel 94 and is removed therefrom through line 96. Any residual water vapor in the gas stream exiting from separator 94 is absorbed by the molecular sieve material in vessel 54. The sieve material also removes by adsorption any hydrocarbon, sulfur or other condensible trace contaminants in the gas stream.

The gas underflow from molecular sieve bed 54 flowing through line 58 at a temperature of about 45° F. in the example described enters the carbon dioxide stripper reboiler which brings the gas stream into heat exchange relationship with liquid in the bottom of column 102 thereby lowering the temperature of the gas to a level of for example +5° F. The heat exchangers 106 and 108 are operated under conditions such that the gas stream is liquefied by passage through exchangers 106 and 108 (which for example may receive ammonia refrigerant at −10° F. and −28° F. respectively) thus causing liquid carbon dioxide to be directed into the intermediate portion of stripper column 102 via line 104 at a temperature of about −9° F. The non-liquefiable constituents separated from the liquefied carbon dioxide to go overhead for venting via line 130 while liquid is removed from the fractionator zone 56 via line 118 leading to a source of storage, transportation or use.

If desired and as indicated in the schematic representation of FIG. 2, another refrigeration exchanger 120 may be provided in line 118 receiving ammonia refrigerant at about −28° F. so that the product of storage is at a temperature of nitrogen that is present in the gas stream as a result of using air as the oxidizing medium introduced into oxidizer 46, and a certain proportion of carbon dioxide which did not liquefy at the temperatures and pressures of the feed stock as it is introduced into vessel 102.

The carbon dioxide product directed to storage or other use through line 118 is virtually free of contaminants and is suitable for a wide variety of food applications.

Chemical grade carbon dioxide may be removed from line 58 via line 124 and differs from the product removed via line 118 primarily in the fact that the chemical grade carbon dioxide will contain some amounts of nitrogen and methane and to a lesser degree carbon monoxide. These materials are the ones which are primarily removed in the fractionation zone IV as represented by the carbon dioxide stripper column 102 in associated refrigeration equipment.

Generally speaking for food grade applications, the hydrogen sulfide in the final product should be less than one part per million, total sulfur less than five parts per million, the total non-condensible hydrocarbons less than thirty parts per million, and the total condensible hydrocarbons less than five parts per million. The $CO_2$ final food grade product must be odor and taste free.

If the hydrogen sulfide content of the feed stock is of such nature that it is not feasible to use zinc oxide absorbers alone because of the cost of the absorbant which must be thrown away after use, a Stretford hydrogen sulfide facility or its equivalent may be employed for treating the gas stream line immediately ahead of the zinc oxide absorbers which in this instance would simply act as guard beds to preclude direction of light sulfur compounds into oxidation reactor 46.

The provision of oxidation reactor 46 is an important aspect of the process because hydrogen sulfide and carbonyl sulfide tend to form an azeotropic mixture which does not allow effective separation thereof in distillation or equivalent apparatus. Similarly, carbon dioxide and ethane form an azeotropic mixture which cannot be economically separated by distillation or fractionation processes.

It is also to be noted in this respect that the gas stream is not cooled below about 45° F. before passage into the carbon dioxide stripper column 102 to prevent the formation of carbon dioxide or carbon monoxide water hydrates.

Referring again to the primary processing stages of the process as depicted schematically in FIG. 1, it is to be understood that in Stage I rectification of the gas stream is carried out in a manner to effect removal of heavy sulfur compounds thus minimizing the usage of zinc oxide in the second stage. In like manner, the zinc oxide absorption Stage II is effective to remove light sulfur compounds which would poison the oxidation catalyst and remain as a contaminant in the final product. Oxidation which occurs in Stage III removes ethane and higher hydrocarbons to eliminate such materials as contaminants in the final product and also assures that only a part of the methane is oxidized at this point if present in significant quantities. The drying which occurs between Stages III and IV removes water to prevent formation of carbon dioxide and carbon monoxide water hydrates during liquefaction. The gas stream is then liquefied to convert the carbon dioxide to a form for easier handling and storage. Finally, stripping of the liquefied product is carried out to remove light contaminants such as the residual methane and carbon monoxide as well as any nitrogen to bring the final end product within food grade specifications.

By oxidizing the ethane and higher hydrocarbons in vessel 46 and effecting only partial oxidation of methane if the level thereof in the feed stock is above 1%, the outlet temperature of the gas from the oxidizer is maintained at a reasonable level which would not be the case if all of the methane in the product was oxidized. The remaining methane may then be effectively removed by stripping the same from the final product in $CO_2$ stripper column 102. Control over the degree of oxidation of the hydrocarbons present in the feed gas directed to oxidizer 46 can be closely and readily controlled by regulation of the air or oxygen supply, the nature of the catalyst employed, the temperature of the infeed to the oxidation reactor, the length of the catalyst bed and whether or not means is employed to cool the product along its passage through Stage III as for example by using two beds in series as indicated, or redirection of cool gas back into the reactor to maintain the temperature at a required level. If an effort were made in the oxidation Stage III to convert all of the methane to carbon monoxide and carbon dioxide, the process would be prohibitively expensive because of the fact that additional quantities of nitrogen would be present in the final product requiring removal thereof assuming air is the source of oxygen, or in the case of supply of pure oxygen, the need for a stoichiometric amount of $O_2$ would make the process uneconomical because of the cost of pure oxygen.

We claim:

1. A method of producing liquid food grade carbon dioxide from an impure carbon dioxide gas stream containing contaminants such as a combination of heavy and light sulfur compounds and $C_1+$ hydrocarbons, said method comprising the steps of:

passing the impure gas stream through a fractionation zone operated under conditions to condense a part of the feed gas with the resulting liquid being brought into contacting relationship with incoming feed gas thereby causing heavy sulfur compounds and $C_3+$ hydrocarbons to be dissolved in the liquid;

separating the liquid containing said heavy sulfur compounds and the $C_3+$ hydrocarbons from the remaining treated gaseous feed stream;

then subjecting the treated gas stream to an absorption medium capable of removing light sulfur compounds from the gas stream;

next introducing the gas stream inot an oxidizing atmosphere in the presence of a catalyst such that the temperature is maintained in the range of from about 800° F. to about 1600° F. and the residence time is such that in the case of a gas stream fed thereto containing less than about 1% $C_1$ hydrocarbon, essentially all of the $C_2$ hydrocarbon and a major proportion of such $C_1$ hydrocarbon is oxidized and converted to carbon oxide and water whereas in the case of a gas stream containing about 1% or more $C_1$ hydrocarbon, essentially all of the $C_2$ hydrocarbon and a minor proportion of the $C_1$ hydrocarbon is oxidized and converted to carbon oxide and water;

treating the gas stream to remove water and other condensible materials therefrom without forming appreciable amounts of carbon oxide-water hydrates;

refregerating the dried gas stream to an extent to liquefy carbon dioxide therein while residual non-condensible constituents at such liquefaction temperature remain in a gaseous state; and separating the non-condensed constituents from the liquified carbon dioxide by subjecting the latter to indirect heat exchange with a medium at a temperature above that of the liquefied carbon dioxide to strip therefrom sufficient volatile non-condensed constituents contained in the liquid carbon dioxide to produce a liquid product which is essentially devoid of $C_2+$ hydrocarbons and contains less than about 35 parts per million of $C_1$ hydrocarbon and a total sulfur content of less than about 5 parts per million.

2. A method as set forth in claim 1 wherein the step of condensing a part of the gas stream to produce a liquid includes condensing a sufficient proportion of the impure gas directed to the fractionation zone and effecting washing of impure gas with such condensed liquid carbon dioxide that the liquid condensed and employed to wash the impure gas on a molar basis is from about 10% to about 300% of the gas stream directed to the fractionation zone.

3. A method as set forth in claim 1 wherein the step of condensing a part of the gas stream to produce a liquid includes condensing a sufficient proportion of the impure gas directed to the fractionation zone and effecting washing of impure gas with such condensed liquid carbon dioxide such that the liquid condensed and employed to wash the impure gas on a molar basis is approximately one-third of the gas stream directed to the fractionation zone.

4. A method as set forth in claim 1, wherein said step of subjecting the gas stream containing about 1% or more $C_1$ hydrocarbons to catalyzed conditions at a temperature and for a period of time is carried out in a manner to obtain conversion of about one-third of the $C_1$ hydrocarbon to carbon oxides and water.

5. A method as set forth in claim 1 wherein said step of removing undesirable amounts of residual hydrocarbons from the liquefied carbon dioxide includes subjecting the latter to a stripping operation wherein all constituents more volatile than carbon dioxide and including carbon monoxide are separated from the food grade liquefied product.

* * * * *